US010637331B2

(12) United States Patent
Du et al.

(10) Patent No.: US 10,637,331 B2
(45) Date of Patent: Apr. 28, 2020

(54) SERVO

(71) Applicant: UBTECH Robotics Corp., Shenzhen (CN)

(72) Inventors: Xuchao Du, Shenzhen (CN); Xinpu Chen, Shenzhen (CN); Meichun Liu, Shenzhen (CN); Lefeng Liu, Shenzhen (CN); Wenquan Shu, Shenzhen (CN); Youjun Xiong, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 675 days.

(21) Appl. No.: 15/323,098

(22) PCT Filed: Oct. 28, 2016

(86) PCT No.: PCT/CN2016/103722
§ 371 (c)(1),
(2) Date: Dec. 30, 2016

(87) PCT Pub. No.: WO2018/076267
PCT Pub. Date: May 3, 2018

(65) Prior Publication Data
US 2018/0183303 A1 Jun. 28, 2018

(51) Int. Cl.
*H02K 7/116* (2006.01)
*H02K 11/215* (2016.01)
(Continued)

(52) U.S. Cl.
CPC ........... *H02K 11/215* (2016.01); *B25J 9/102* (2013.01); *B25J 13/088* (2013.01); *H02K 7/003* (2013.01); *H02K 7/116* (2013.01); *F16H 1/46* (2013.01)

(58) Field of Classification Search
CPC ............................. H02K 7/003; H02K 7/116
(Continued)

(56) References Cited

U.S. PATENT DOCUMENTS

2011/0266990 A1* 11/2011 Murata ................. H02K 11/22
318/400.37
2014/0360298 A1* 12/2014 Wei ........................ H02K 7/116
74/421 A (Continued)

FOREIGN PATENT DOCUMENTS

CN          104991142 A      10/2015

OTHER PUBLICATIONS

ISR for PCT/CN2016/03722.
Written opinions of ISA for PCT/CN2016/103722.

*Primary Examiner* — Gary A Nash

(57) ABSTRACT

A servo (1) includes a power input device (14), a gear assembly (15) drive-connected to the power input device (14), a power output frame (13) that is driven to rotate by the gear assembly (15), an output shaft (131) arranged at the power output frame (13), a magnetic encoding assembly (121) that is arranged at a rotation center axis of the power output frame (13) and used to detect a rotation angle of the output shaft (131) relative to the rotation center axis, and a circuit board (12) connected to the magnetic encoding assembly (121) and the power input device (14). The magnetic encoding assembly (121) does not tend to be affected by environment, to accurately detect the rotation angle of the output shaft (131) relative to the rotation center axis. Meanwhile, the magnetic encoding assembly (121) is simple to structure and light in weight, which facilitates it to be fixed to the servo (1).

20 Claims, 2 Drawing Sheets

(51) Int. Cl.
*H02K 7/00* (2006.01)
*B25J 9/10* (2006.01)
*B25J 13/08* (2006.01)
*F16H 1/46* (2006.01)

(58) Field of Classification Search
USPC .................. 310/68 R, 69, 71, 79, 83, 84
See application file for complete search history.

(56) References Cited

U.S. PATENT DOCUMENTS

| | | | |
|---|---|---|---|
| 2015/0207368 A1* | 7/2015 | Chen | H02K 1/185 |
| | | | 310/83 |
| 2015/0285339 A1* | 10/2015 | Chen | F16H 1/206 |
| | | | 74/412 R |

* cited by examiner

SERVO

BACKGROUND

1. Technical Field

The present invention belongs to the field of robotics, and particularly relates to a servo.

2. Description of Related Art

Servos are initially used in vessels for realizing their turning functions. Since their rotation angles can be continuously controlled by programs and servos further have advantages of small volume, light weight, large torque, and large accuracy, they are thus widely used in smart vehicles for realizing turnings and in various motions of joints of robots. What needs to be noted is that robots have many joints, and each joint is called by us to be one degree of freedom. Average machine bodies have a dozen degrees of freedom. In this way, it can ensure the flexibility of motions. In the machine bodies of robots, we usually use servos as connection parts of each joint, and servos can accomplish positioning and motions of each joint.

Conventional servos of robots usually use potentiometers to defect rotation angle of servos. Servos mainly include a servo disc, a speed reduction gear set, a potentiometer, a DC motor and a circuit board. The circuit board receives control signals from signal lines and controls the motor to rotate. The motor drives a series of gear sets, and motions are transmitted to the servo disc after speed reduction. An output shaft of the servo disc is connected to the potentiometer. The servo disc drives the potentiometer as it rotates. The potentiometer detects the rotation angle of the servo and outputs a voltage signal to the circuit board for feedbacking. The circuit board then determines the rotation direction and rotation speed of the motor according to a position where the output shaft rotates, thereby stopping a target. However, the conventional method of using potentiometers to detect rotation angle of servos, has restricted detection accuracy because potentiometers are realized by adjusting the value of voltage (including direct current voltage and signal voltage) and current, and voltage tends to be disturbed by surrounding environment (e.g., temperature, sealing, etc.) and fluctuates. Meanwhile, potentiometers make servos heavy in weight.

In summary, there mainly exists the following problems in the servos of prior arts: Firstly, potentiometers tend to generate errors due to being affected by environment during detecting the rotation angle of servos, thereby resulting in that potentiometers are unable to accurately detect the rotation angle of the servos. Secondly, the servos are heavy in weight because of using potentiometers.

SUMMARY

The object of the present invention is to provide a servo, aiming to resolve the technical problems in prior arts that servos are heavy in weight and rotation angle is unable to be accurately detected.

The present invention is achieved in this way: A servo includes a power input device, a gear assembly drive-connected to the power input device, a power output frame that is driven to rotate by the gear assembly, an output shaft arranged at the power output frame, a magnetic encoding assembly that is arranged at a rotation center axis of the power output frame and configured to detect a rotation angle of the output shaft relative to the rotation center axis, and a circuit board connected to the magnetic encoding assembly and the power input device.

Being preferred technical solutions of the present invention:

Further, the power output frame is inscribed to a flange disc, and a central axis of the flange disc coincides with the rotation center axis of the power output frame.

Further, the circuit board is arranged on the flange disc. The magnetic encoding assembly is arranged on the circuit hoard and located at the central axis of the flange disc. The circuit board is provided with a sliding groove that is slidably mated with the output shaft.

Further, the output shaft is set to be two in number, and the two output shafts are symmetrically arranged at two sides of the magnetic encoding assembly.

Further, the flange disc is provided with a connection post for fixing the circuit board, and the circuit board is provided with a first connection hole opposing the connection post Further, the connection post includes a first connection post and a second connection post arranged to oppose the first connection post, and the first connection post and the second connection post are different in size.

Further, the flange disc is further provided with a connection block, and the connection block is provided with a second connection hole for connecting with a robot.

Further, the connection block is arc-shaped, and the arc-shaped connection block is slidably mated with the output shaft.

Further, the circuit board is provided with a cable connector at an end thereof, and the cable connector is electrically coupled to the magnetic encoding assembly.

Further, the gear assembly includes a tube and a planet gear set arranged in the tube. The tube is provided with inner engaged teeth. The planet gear set is provided with outer gears. The inner engaged teeth of the tube are engaged with the outer gears of the planet gear set.

Further, the planet gear set is a three-stage planet reduction gear set.

Further, the power output frame is detachably mounted to one end of the tube.

Further, an end surface of the tube is provided with a plurality of equally spaced first threaded holes, and the power output frame is correspondingly provided with a plurality of second threaded holes opposing the first threaded holes.

Further, the power output frame includes an output planet carrier embedded in the flange disc, the flange disc is provided with a shaft hole, the output planet earner is engaged wish a periphery of the shall hole, and the output shaft is arranged at the output planet carrier.

Further, the magnetic encoding assembly includes a magnet and a magnetic sensor that is arranged to oppose the magnet and configured to detect and process change of magnetic field of the magnet.

The technical effect of the present invention with respect to prior arts is: The servo of the present invention arranges the magnetic encoding assembly at the rotation center axis of the power output frame. When the power output frame rotates along with the gear assembly, a rotation angle of the output shall relative to the rotation center axis is accurately detected by arranging the magnetic encoding assembly at the rotation center axis of the power output frame. Specifically, during the rotation of the output shaft, since the magnetic encoding assembly is located at the rotation center axis of the power output frame, the magnetic encoding assembly does not tend to be affected by environment, and it is convenient for the magnetic encoding assembly to detect and process the signal of the rotation angle of the output shaft relative to the rotation center axis, which avoids the generating of errors, thereby accurately detecting the rotation angle of the servo. Meanwhile, the magnetic encoding assembly is simple in structure and light in weight. It is convenient for the magnetic encoding assembly to be positioned at or fixed to the servo.

BRIEF DESCRIPTION OF THE DRAWINGS

In order to more clearly describe the technical solution(s) of the embodiment(s) of the present invention, the drawings used in the descriptions of the embodiment(s) will be briefly introduced. Obviously, the following described drawings are merely some embodiments of the present invention. To those skilled in the art, other drawings may be obtained based on these drawings without creative work.

The description of drawing signs.

Figure 1:
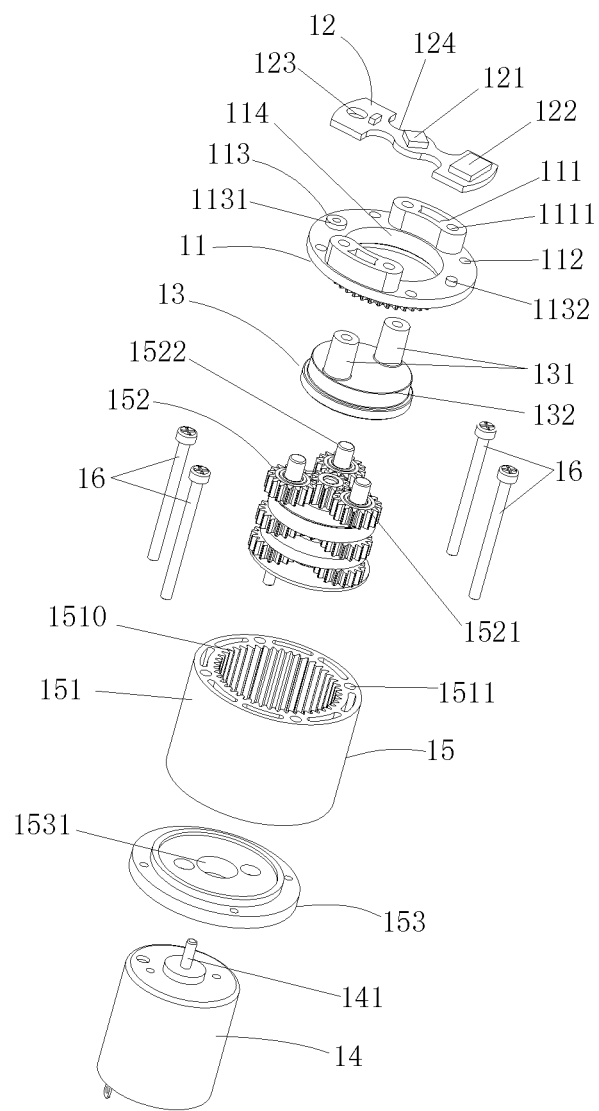
FIG. 1 is an exploded view of a servo provided by a preferred embodiment of the present invention.

In the drawings: 1-SERVO, 11-FLANGE DISC, 111-CONNECTION BLOCK, 1111-SECOND CONNECTION HOLE, 112-SECOND THREADED HOLE, 113-CONNECTION POST, 1131-FIRST CONNECTION POST, 1132-SECOND CONNECTION POST, 114-SHAFT HOLE, 12-CIRCUIT BOARD, 121-MAGNETIC ENCODING ASSEMBLY, 122-CABLE CONNECTOR, 123-FIRST CONNECTION HOLE, 124-SLIDING GROOVE, 13-POWER OUTPUT FRAME, 131-OUTPUT SHAFT, 132-OUTPUT PLANET CARRIER, 14-POWER INPUT DEVICE, 141-SHAFT, 15-GEAR ASSEMBLY, 151-TUBE, 1510-INNER ENGAGED TEETH, 1511-FIRST THREADED HOLE• 152-PLANET GEAR SET, 1521-OUTER GEAR, 1522-PLANET GEAR SHAFT, 153-INPUT DISC, 1531-THROUGH HOLE, 16-SCREW.

DETAILED DESCRIPTION

The embodiment(s) of the present invent ion will be described in detail. The examples of the embodiment(s) are shown in the drawings, throughout which the same or similar reference numerals denote the same or similar elements or elements having the same or similar functions. The following embodiments described by making reference to the drawings are exemplary, aim to explain the present invention, and are not to be construed as limiting the present invention.

In the descriptions of the present invention, it should be understood that orientations or positions denoted by the terms "length", "width", "upper", "lower", "front", "back", "left", "right", "upright", "horizontal", "top", "bottom", "inner" and "outer" are based on the orientations or positions shown in the drawings, are used for the ease of describing the present invention and simplifying descriptions, and are not to denote or imply that the denoted device(s) or element(s) necessarily has specific orientations and are constructed and operated in specific orientations. The terms are thus not to be construed as limiting the present invention.

In addition, the terms "first" and "second" are merely used for descriptive purpose and are not to be construed as denoting or implying relative importance or implying the amount of the denoted technical features. Thus, the feature(s) defined by terms "first" and/of "second" may explicitly or implicitly include One or more the features. In the descriptions of the present invention, the term "plurality" means two or more unless otherwise explicitly defined.

In the present invention, unless otherwise explicitly defined and limited, the terms "mount", "connect", "join" and "fix" should be broadly understood. For example, they may refer to a fixed connection, a detachable connection or an integrally formation. They may refer to a mechanical connection or an electrical connection. They may refer to a direct connection or an indirect connection via an intermediate medium. They may refer to a communication of the interiors of two elements or an interaction relationship. To those having ordinary skill in the art, the meaning of the aforementioned terms in the present invention may be understood according to specific circumstances.

In order to make object, technical solution and advantages of the present invention more clear, the present invention will be further described in detail in conjunction with embodiments and the drawings.

Figure 2:
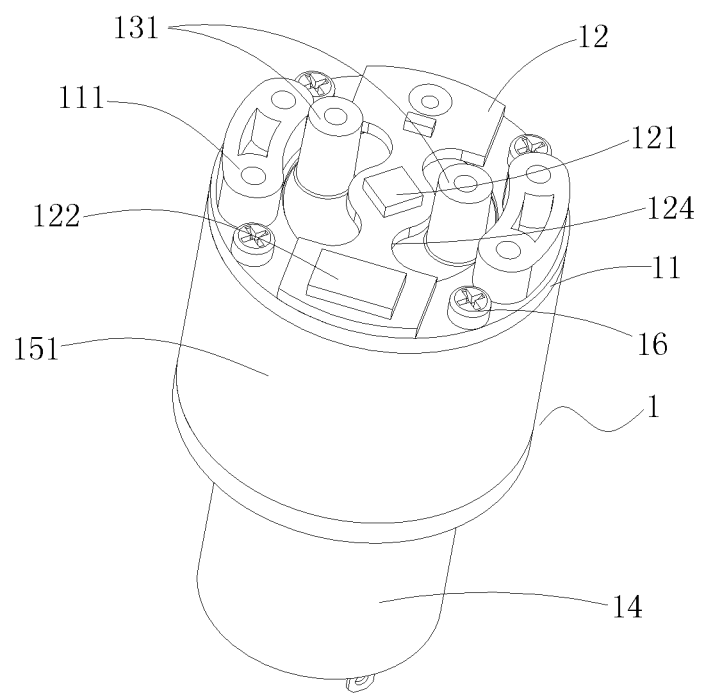
FIG. 2 is a perspective view of a servo provided by a preferred embodiment of the present invention.

Referring to FIGS. 1 and 2, a servo 1 of a preferred embodiment of the present invention is applied to a robot. The servo 1 includes a power input device 14, a gear assembly 15 connected to the power input device 14, a power output frame 13 that is driven to rotate by the gear assembly 15, an output shaft 131 arranged at the power output frame 13, a magnetic encoding assembly 121 that is arranged at a rotation center axis of the power output frame 13 and used to detect a rotation angle of the output shaft 131 relative to the rotation center axis, and a circuit board 12 electrically connected to the magnetic encoding assembly 121.

In the present embodiment, the power input device 14 is electrically connected to a main control circuit board (not shown) for providing power to the gear assembly 15. The gear assembly 15 drives the output shall 131 that is arranged at the power output frame 13 to rotate. The circuit board 12 controls the magnetic encoding assembly 121 that is arranged at a rotation center axis of the power output frame 13. By arranging the magnetic encoding assembly 121 at the rotation center axis of the power output frame 13, it enables the magnetic encoding assembly 121 to accurately detect the rotation angle of the output shaft 131 relative to the rotation center axis.

The servo 1 provided by the embodiment of the present invention arranges the magnetic encoding assembly 121 at the rotation center axis of the power output frame 13. When the power output frame 13 rotates along with the gear-assembly 15, the rotation angle of the output shaft 131 relative to the rotation center axis is accurately detected by arranging the magnetic encoding assembly 121 at the rotation center axis of the power output frame 13. Specifically, during the rotation of the output shaft 131, since the magnetic encoding assembly 121 is located at the rotation center axis of the power output frame 13, the magnetic encoding assembly 121 does not tend to be affected by environment, and it is convenient for the magnetic encoding assembly 121 to detect and process the signal of the rotation angle of the output shaft 131 relative to the rotation center axis, which avoids the generating of errors, thereby accurately detecting the rotation angle of the servo 1. Additionally, the magnetic encoding assembly 121 is simple in structure and light in weight. It is convenient for the magnetic encoding assembly 121 to be positioned at or fixed to the servo 1.

It should be noted that the magnetic encoding assembly 121 can use conventional technical means. Specifically, in the present embodiment, the magnetic encoding assembly 121 may include a magnet and a magnetic sensor The magnetic sensor may be arranged on the circuit board 12. The magnet may be arranged at an outer joint component of a robot. The power output frame 13 of the servo 1 is connected to a joint of the robot. The change of magnetic field is detected and processed by the magnetic sensor, and signals are outputted by a cable. Specifically, the magnet and the magnetic sensor both use conventional technical means. Additionally, a magnetic field detection chip may be arranged on the circuit board 12. The change of magnetic field is detected and processed by the magnetic field detection chip integrated on the circuit board 12, thereby accurately detecting the rotation angle of the output shaft 131 relative to the rotation center axis. Additionally, the position of the magnet may be arranged according to actual need so as to make it convenient for the magnetic sensor to detect the rotation angle of the servo through rotating magnetic field.

Additionally, for the ease of mounting and fixing, the power output frame 13 is inscribed to a flange disc 11. A central axis of the flange disc 11 coincides with the rotation center axis of the power output frame 13. The flange disc 11 is further connected to an arranged tube 151 by screws 16. The flange disc 11 is provided with a shaft hole 114 in a center thereof. The power output frame 13 is mounted in the shaft hole 114. The power output frame 13 includes an output planet carrier 132 embedded in the shaft hole 114 of the flange disc 11. The output planet carrier 132 is engaged with a periphery of the shaft hole 114. The output shaft 131 is arranged at the output planet carrier 132.

Since the rotation center axis of the power output frame 13 coincides with the central axis of the flange disc 11, the circuit board 12 is thus arranged on the flange disc 11 and the magnetic encoding assembly 121 is arranged on the circuit board 12 and located at the rotation axis of the flange disc 11, for making it convenient for the magnetic encoding assembly 121 to be arranged at the rotation center axis of the power output frame 13. The circuit hoard 12 is provided with sliding groove 124 that is slidably mated with the output shaft 131 for making it convenient for output shaft 131 to rotate to better output power.

Further, tor enhancing the balance and stability of the power output of the output shaft 131, the output shaft 131 is set to be two in number. The two output shafts 131 are symmetrically arranged at two sides of the magnetic encoding assembly 121. It should be added that the magnetic encoding assembly 121 is fixed in the middle of the two output shafts 131. That is, the output shafts 131 of the servo 1 are in the shape of dual protruding posts, the circuit board 12 is arranged between the dual protruding posts, and the magnetic encoding assembly 121 is located at the center of the circuit board 12. Since the magnetic encoding assembly 121 is located at the center of the circuit board 12, it enables the magnetic encoding assembly 121 to be fixed in the middle of the two output shafts 131, and the magnetic encoding assembly 121 does not rotate along with the two output shafts 131, which does not tend to generate errors and ensures that the magnetic encoding assembly 121 detects the rotation angle of the servo 1 accurately. It can be understood that considering that the magnetic encoding assembly 121 is arranged at the rotation center axis of the power output frame 13 and for more accurately detecting the rotation angel of the output shaft 131 relative to the rotation center axis, the number of the output shaft 131 may be plural, and the plural output shafts 131 may be symmetrically arranged at two sides of the magnetic encoding assembly 121.

In order to facilitate the connection of the flange disc 11 and the circuit hoard 12, the flange disc 11 is provided with a connection post 113 for fixing the circuit board 12, and the circuit board 12 is provided with a first connection hole 123 opposing the connection post 113. Detailedly, in order to facilitate the positioning and firm connection Of the flange disc 11 and the circuit board 12, the number of connection posts 113 may be two. Preferably, considering that increasing the contact area between the connection posts 113 and the circuit board 12 to cause the circuit board 12 to be more firmly mounted on the flange disc 11, the connection post 113 includes a first connection post 1131 and a second connection post 1132 arranged to oppose the first connection post 1131, and the first connection post 1131 and the second connection post 1132 are different in size. Specifically, the cross sections of the first connection post 1131 and the second connection post 1132 both are circular. The diameters of the first connection post 1131 and the second connection post 1132 are different. Additionally, the shape of the first connection post 1131 and the second connection post 1132 may be set to be different. For example, the cross section of the first connection post 1131 may be set to be triangle (not shown), and the cross section of the second connection post 1132 may be set to be circular.

Detailedly, the flange disc 11 is further provided with a connection block 111. The connection block 111 is provided with a second connection hole 1111 for connecting with a robot. It should be added that the connection block 111 is connected to the skeleton of the robot. The output shaft 131 is connected to a joint of the robot.

In order to avoid that the connection block 111 affects the rotation of the output shaft 131, the connection block 111 is arc-shaped, and the arc-shaped connection block 111 is slidably mated with the output shaft 131. In this way, the rotation of the output shaft 131 relative to the flange disc 11 becomes smooth, which is favorable to the power output of the output shaft 131.

The circuit board 12 is provided with a cable connector 122 at an end thereof. The cable connector 122 is electrically coup led to the magnetic encoding assembly 121. Further, the cable connector 122 connects the magnetic encoding assembly 121 to the main control circuit board of the servo, thereby facilitating the circuit board 12 to feedback the signal from the magnetic encoding assembly 121 to the main control circuit board of the servo.

The gear assembly 15 includes a tube 151 and a planet gear set 152 arranged in the tube 151. The tube 151 is provided with inner engaged teeth 1510. The planet gear set 152 is provided with outer gears 1521. The inner engaged teeth 1510 of the tube 151 is engaged with the outer gears 1521 of the planet gear set 152. In the embodiment, a planet gear shaft 1522 of the planet gear set 152 is connected to the bottom of the power output frame 13. Additionally, the bottom of the tube 15 is provided with an input disc 153. The center of the input disc 153 is provided with a through hole 1531. A shaft 141 of the power input device 14 passes through the through hole 1531 of the input disc 153 so as to facilitate the input of power.

Detailedly, the power input device 14 includes an electric motor. The planet gear set 152 is driven by the electric motor. The planet gear set 152 drives the power output frame 13 to rotate through the transmission of the planet gear set 152 and the inner engaged teeth 1510 of the tube 151. Thus, the output shafts 131 rotate together with the power output frame 13 as driven by the planet gear set 152. The output shafts 131 are pivotally connected to the joint component of a robot so as to enable the servo 1 to be driven by the two output shafts 131 to rotate relative to the joint component.

Preferably, the planet gear set 152 may be set to be a three-stage planet reduction gear set. It should be noted that the three-stage planet reduction gear set uses conventional technology. The three-stage planet reduction gear set may also be expressed as three-stage planet reducer. The speed reduction ratio of its transmission is ensured via the three-stage planet reducer. Detailedly, there are several planet gear sets 152 that are stacked in three layers. Each layer of the planet gear set 152 includes three outer gears 1521. The three outer gears 1521 are respectively arranged at three planet gear shafts 1522 and are rotatable at the three planet gear shafts 1522. It should be further noted that the three planet gear shafts 1522 and the power output frame 13 are integrally formed for facilitating the output of power. Additionally, in order to facilitate the mounting and mating of the power output frame 13 and the tube 151, the power output frame 13 is detachably mounted to one end of the tube 151. Further, in order to facilitate the mounting and detaching, an end surface of the tube 151 is provided with a plurality of equally spaced first threaded holes 1511. The power output frame 13 is correspondingly provided with a plurality of second threaded boles 112 opposing the first threaded holes 1511. The tube 151 and the power output frame 13 are connected to each other via screws 16.

The foregoing descriptions are merely embodiments of the present invention, and not to limit the present invention. Any modifications, equivalent replacements and improvements, etc., made within the spirit and principles of the present invention, shall fall within the protection scope of the present invention.

What is claimed is:

1. A servo, comprising:
   a power input device, a gear assembly connected to the power input device;
   a power output frame that is driven to rotate by the gear assembly;
   an output shaft arranged at the power output frame;
   a magnetic encoding assembly that is arranged at a rotation center axis of the power output frame and configured to detect a rotation angle of the output shaft relative to the rotation center axis; and
   a circuit board connected to the magnetic encoding assembly and the power input device,
   wherein the power output frame is inscribed to a flange disk, a central axis of the flange disc coincides with the rotation center axis of the power output frame, and the circuit board is arranged on the flange disc, the magnetic encoding assembly is arranged on the circuit board and located at the central axis of the flange disc, and the circuit board is provided with a sliding groove the is slidably mated with the output shaft.

2. The servo according to claim 1, wherein the output shall is set to be two in number, and the two output shafts are symmetrically arranged at two sides of the magnetic encoding assembly.

3. The servo according to claim 1, wherein the flange disc is provided with a connection post for fixing the circuit board, and the circuit board is provided with a first connection hole opposing the connection post.

4. The servo according to claim 3, wherein the connection post comprises a first connection post and a second connection post arranged to oppose the first connection post, and the first connection post and the second connection post are different in size.

5. The servo according to claim 1, wherein the flange disc is further provided with a connection block, and the connection block is provided with a second connection hole for connecting with a robot.

6. The servo according to claim 5, wherein the connection block is arc-shaped, and the arc-shaped connection block is slidably mated with the output shaft.

7. The servo according to claim 1, wherein the circuit board is provided with a cable connector at an end thereof, and the cable connector is electrically coupled to the magnetic encoding assembly.

8. The servo according to claim 1, wherein the gear assembly comprises a tube and a planet gear set arranged in the tube, the tube is provided with inner engaged teeth, the planet gear set is provided with outer gears, and the inner engaged teeth of the tube is engaged with the outer gears of the planet gear set.

9. The servo according to claim 8, wherein the planet gear set is a three-stage planet reduction gear set.

10. The servo according to claim 8, wherein the power output frame is detachably mounted to one end of the tube.

11. The servo according to claim 10, wherein an end surface of the tube is provided with a plurality of equally spaced first threaded holes, and the power output frame is correspondingly provided with a plurality of second threaded holes opposing the first threaded holes.

12. The servo according to claim 1, wherein the power output frame comprises an output planet carrier embedded in the flange disc, the flange disc is provided with an shaft hole, the output planet carrier is engaged with a periphery of the shaft hole, and the output shaft is arranged at the output planet carrier.

13. The servo according to claim 1, wherein in that the magnetic encoding assembly comprises a magnet and a magnetic sensor that is arranged to oppose the magnet and configured to detect and process change of magnetic field of the magnet.

14. A servo, comprising:
    a power input device, a gear assembly connected to the power input device;
    a power output frame that is driven to rotate by the gear assembly;
    an output shaft arranged at the power output frame;
    a magnetic encoding assembly that is arranged at a rotation center axis of the power output frame and configured to detect a rotation angle of the output shaft relative to the rotation center axis; and
    a circuit board connected to the magnetic encoding assembly and the power input device, wherein the output shaft is set to be two in number, and the two output shafts are symmetrically arranged at two sides of the magnetic encoding assembly.

15. The servo according to claim 14, wherein the circuit board is provided with a cable connector at an end thereof, and the cable connector is electrically coupled to the magnetic encoding assembly.

16. The servo according to claim 14, wherein the magnetic encoding assembly comprises a magnet and a magnetic sensor that is arranged to oppose the magnet and configured to detect and process change of magnetic field of the magnet.

17. A servo, comprising:
    a power input device, a gear assembly connected to the power input device;
    a power output frame that is driven to rotate by the gear assembly;
    an output shaft arranged at the power output frame;
    a magnetic encoding assembly that is arranged at a rotation center axis of the power output frame and configured to detect a rotation angle of the output shaft relative to the rotation center axis; and
    a circuit board connected to the magnetic encoding assembly and the power input device, wherein the gear assembly comprises a tube and a planet gear set arranged in the tube, the tube is provided with inner engaged teeth, the planet gear set is provided with outer gears, and the inner engaged teeth of the tube is engaged with the outer gears of the planet gear set.

18. The servo according to claim 17, wherein the planet gear set is a three-stage planet reduction gear set.

19. The servo according to claim 17, wherein the power output frame is detachably mounted to one end of the tube.

20. The servo according to claim 19, wherein an end surface of the tube is provided with a plurality of equally spaced first threaded holes, and the power output frame is correspondingly provided with a plurality of second threaded holes opposing the first threaded holes.

* * * * *